US011829944B2

(12) United States Patent
Green et al.

(10) Patent No.: US 11,829,944 B2
(45) Date of Patent: Nov. 28, 2023

(54) MOBILE STOREFRONT CONTROL SYSTEMS AND METHODS

(71) Applicant: MATCO TOOLS CORPORATION, Stow, OH (US)

(72) Inventors: John Green, Aurora, OH (US); Brian Katzenmeyer, Stow, OH (US); Rayne Covault, Munroe Falls, OH (US); Kevin Fanning, Atwater, OH (US); Mark Thomas, Aurora, IL (US)

(73) Assignee: MATCO TOOLS CORPORATION, Stow, OH (US)

( * ) Notice: Subject to any disclaimer, the term of this patent is extended or adjusted under 35 U.S.C. 154(b) by 72 days.

(21) Appl. No.: 17/242,603

(22) Filed: Apr. 28, 2021

(65) Prior Publication Data

US 2021/0248550 A1 Aug. 12, 2021

Related U.S. Application Data

(63) Continuation of application No. 16/242,445, filed on Jan. 8, 2019, now Pat. No. 11,023,849.

(Continued)

(51) Int. Cl.
*G06Q 10/08* (2023.01)
*G06Q 20/12* (2012.01)
(Continued)

(52) U.S. Cl.
CPC ........... *G06Q 10/087* (2013.01); *G06Q 20/12* (2013.01); *G06Q 20/42* (2013.01)

(58) Field of Classification Search
CPC ...... G06Q 10/087; G06Q 20/12; G06Q 20/42; G06Q 30/0603; G06Q 30/0643; G06Q 20/203; G06Q 20/322; G07F 9/023
See application file for complete search history.

(56) References Cited

U.S. PATENT DOCUMENTS 8,533,053 B2   9/2013   Brown et al.
8,636,208 B2   1/2014   Urban et al.
(Continued)

FOREIGN PATENT DOCUMENTS

WO   WO-0152143 A1 *   7/2001   ............. G06Q 10/08

OTHER PUBLICATIONS

Bianchi, Jessica. "Deals on Wheels: Why More Retailers Are Taking to the Streets". <https://www.shopify.com/retail/mobile-business-why-more-retailers-are-taking-to-the-streets>. Feb. 2017. (Year: 2017).*

(Continued)

*Primary Examiner* — Nathan A Mitchell
(74) *Attorney, Agent, or Firm* — Hahn Loeser & Parks LLP

(57) ABSTRACT

The present application provides systems and methods for a mobile storefront having direct customer access to inventory and pricing from a mobile storefront. In particular, systems and methods provide an application usable by customers to purchase goods or services from a mobile storefront through an electronic communication device. This includes reserving and purchasing products in inventory of the mobile storefront or pooled inventory from multiple mobile storefronts in an area, reserving and purchasing services and/or support, and for communicating directly with an electronic communication device of the mobile storefront.

20 Claims, 6 Drawing Sheets

Related U.S. Application Data

(60) Provisional application No. 62/615,326, filed on Jan. 9, 2018.

(51) Int. Cl.
    *G06Q 20/42*     (2012.01)
    *G06Q 10/087*     (2023.01)

(56) References Cited

U.S. PATENT DOCUMENTS

| | | | |
|---|---|---|---|
| 2002/0194047 A1* | 12/2002 | Edinger | G06Q 30/0201 705/7.29 |
| 2004/0034571 A1* | 2/2004 | Wood | G06Q 30/0601 705/26.1 |
| 2005/0137935 A1 | 6/2005 | Lee | |
| 2006/0157364 A1* | 7/2006 | Sproul | B25H 3/06 206/372 |
| 2008/0314981 A1* | 12/2008 | Eisenson | G06Q 10/0875 705/28 |
| 2010/0036755 A1* | 2/2010 | Saghbini | G06Q 10/00 705/28 |
| 2010/0076853 A1* | 3/2010 | Schwarz | G06Q 30/04 705/26.1 |
| 2011/0153469 A1* | 6/2011 | Mackenzie | G06Q 50/28 705/28 |
| 2011/0313811 A1* | 12/2011 | Urban | G06Q 20/203 296/24.3 |
| 2012/0166311 A1* | 6/2012 | Dwight | G06Q 30/0617 705/26.43 |
| 2013/0036023 A1* | 2/2013 | Koplovitz | G06Q 20/3223 705/26.8 |
| 2014/0089050 A1* | 3/2014 | Akin | G06Q 30/02 705/7.34 |
| 2015/0120364 A1* | 4/2015 | Deshpande | G06Q 10/06312 705/7.22 |
| 2015/0170099 A1* | 6/2015 | Beach-Drummond | G06Q 30/0603 705/26.81 |
| 2015/0286972 A1 | 10/2015 | Deshpande et al. | |
| 2015/0317720 A1 | 11/2015 | Ramaratnam et al. | |
| 2015/0371205 A1 | 12/2015 | Proud et al. | |
| 2017/0039547 A1* | 2/2017 | Bonsi | G06Q 20/3278 |
| 2017/0124547 A1* | 5/2017 | Natarajan | G06Q 20/202 |
| 2017/0308851 A1* | 10/2017 | Beach-Drummond | G06Q 10/08355 |
| 2018/0118078 A1* | 5/2018 | Alkhaldi | G06Q 10/083 |
| 2018/0181907 A1* | 6/2018 | Esmailzadeh | G06Q 20/3224 |
| 2018/0253727 A1* | 9/2018 | Ortiz | G06Q 20/108 |
| 2019/0137169 A1* | 5/2019 | Hosokawa | H04M 1/72412 |
| 2019/0180227 A1* | 6/2019 | Yamaguchi | G06Q 10/087 |
| 2019/0188634 A1* | 6/2019 | Yamaguchi | G06Q 30/0635 |
| 2019/0205827 A1* | 7/2019 | Yamaguchi | G06Q 30/06 |
| 2019/0256334 A1* | 8/2019 | High | H04W 4/021 |

OTHER PUBLICATIONS

Bianchi, Jessica. "Deals on Wheels: Why More Retailers Are Taking to the Streets". <htpps://www.shopify.com/retail/mobile-business-why-more retailers are taking-to-the-streets>. Feb. 2017. (Year: 2017).

"Chassis for the Long Haul". LDVUSA. <https://web.archive.org/web/20171107071145/https://www.ldvusa.com/category/tool-trucks/cab-chassis/>. Nov. 2017. (Year: 2017).

PCT/US2019/012660 International Search Report and Written Opinion dated Apr. 10, 2019, 12 pages.

List of versions of Matco Tools app (https://apkfab.com/matco-tools/com.matcotools.mobile.catalogiversions, accessed on Dec. 1, 2022) including screenshots of 2016 version 1.0.0, 11 pages.

* cited by examiner

MOBILE STOREFRONT CONTROL SYSTEMS AND METHODS

CROSS-REFERENCE TO RELATED APPLICATIONS

This application is a continuation application of U.S. patent application Ser. No. 16/242,445, filed on Jan. 8, 2019 and entitled "MOBILE STOREFRONT CONTROL SYSTEMS AND METHODS", which claims the benefit of and priority to U.S. Provisional Application No. 62/615,326, filed Jan. 9, 2018 and entitled "SYSTEM AND METHOD FOR IMPROVED PRODUCT AND STORE TRANSACTIONS", the entirety of both are incorporated herein by reference.

BACKGROUND OF THE INVENTIONS

Field of the Inventions

This application relates generally to operation of mobile storefronts including inventory management, sales, and marketing and, more particularly, to systems and methods for enhancing mobile storefront capabilities for improved customer experience and meeting customer demand through automated facilitation and coordination between the DBS, the mobile store, the mobile store operator, and/or the customer.

Description of Related Art

Mobile storefronts are utilized in many industries. Mobile storefronts, as used herein, refers to vehicles transporting and displaying products for sale where the mobile storefront transports available products to a point of sale, such as to a customer's location, to an event, or other location. Mobile storefronts, however, have limited capacity and, therefore, must limit the inventory available for immediate sale. This is increasingly troublesome in the automotive repair industry where the number of highly specialized products or services is only compounded by the number of possible automotive repairs.

Mobile storefronts may be one part of a system where the system is managed, maintained, or operated by a Distributor Business System (DBS). By example, the DBS may operate multiple mobile storefronts and support each mobile storefront with the necessary sales, marketing, branding, and manufacturing capabilities. In some examples, the relationship between the mobile storefront and the DBS is a franchisor-franchisee relationship.

Often, the DBS offers more products for sale than there is space available in a single mobile storefront. These products may be offered for sale directly from the mobile storefront inventory, through a catalog, at a brick and mortar storefront, or even by way of e-commerce. Although delivery times for e-commerce purchases have greatly improved, e-commerce still does not resolve situations where a product may be needed immediately at the customer's location, at the time of a scheduled site visit, or where a mobile store distributor needs to provide support or services in combination with the product. Likewise, although brick and mortar retail locations may provide greater product inventory, brick and mortar retail locations also do not resolve situations where a product may be needed immediately at a customer location, at the time of a scheduled site visit, or where a mobile store distributor needs to provide support or service in combination with the product at the customer location, or an event.

Mobile storefronts bridge this gap between e-commerce and brick and mortar retail locations. Mobile storefronts, however, do not provide the inventory availability of e-commerce or brick and mortar stores. These problems are only further amplified by the complexities and the demands found across franchise distribution models comprising multiple entities and parties. Therefore, systems and methods for controlling distribution of products and services through a mobile storefront is needed.

BRIEF SUMMARY OF THE INVENTIONS

The present disclosure relates generally to providing systems and methods to enhance the functionality of a DBS or a franchise distribution model, to enable customers to shop between world wide web channels and mobile store(s), or storefront(s), at any time of day or night and any day of the year. In addition, the system synchronizes product availability on the app with the mobile store(s) and distributor/manufacturer inventory levels. There is also provided a distributor purchase confirmation and approval process. The systems and methods allow for control of inventory, sales, and marketing and, in an example, allow for provisioning inventory control of a mobile storefront in relation to customer demand, logistics, or other factors. Systems and methods for improved mobile storefront distribution is provided herein to compete directly with e-commerce and brick and mortar stores. The systems and methods of the present disclosure provide inventive concepts for efficiently and immediately confirming availability and/or providing products, support, and services onsite, such as at a customer's location, an event, or other location.

A simplified summary is provided herein to help enable a basic or general understanding of various aspects of exemplary, non-limiting examples that follow in the more detailed description and the accompanying drawings. This summary is not intended, however, as an extensive or exhaustive overview. Instead, the sole purpose of the summary is to present some concepts related to some exemplary non-limiting examples in a simplified form as a prelude to the more detailed description of the various examples that follow.

In various, non-limiting examples, a software application is provided to run on a variety of computing devices such as computer, tablets, and handheld communication devices, such as smartphones. In particular, the software application is provided to facilitate a complex interaction between multiple entities or parties in a DBS or a franchise distribution model for facilitating the necessary inventory, support, and services of a mobile storefront based directly upon customer demands, forecasts, and/or other market or customer information.

The presently disclosed systems and methods are implemented at a mobile storefront with direct customer inventory control as follows. The mobile storefront comprises an inventory compartment, an electronic communication device, and a processor. The processor is coupled to a computer readable storage medium with computer executable instructions stored thereon. The computer executable instructions are for use in controlling inventory in the inventory compartment of the mobile storefront. The computer readable instructions, when executed by the processor, configure the processor to receive a selection of one or more selected inventory items. The selection is received through the electronic communication device from a selection made through a customer electronic communication device and implemented by a software application. The computer readable instructions, when executed by the processor, further configure the processor to communicate the selection of the one or more selected inventory items to a mobile store distributor for approval. This communication may be performed through the electronic communication device. The computer readable instructions, when executed by the processor, additionally configure the processor to automatically change an availability identifier in the system of the selected inventory item available through the inventory compartment upon receipt of an authorization signal. The authorization signal is a result of the mobile store distributor approval.

A software application may be implemented for direct customer control of the inventory for a mobile storefront as follows. A non-transitory computer readable medium with computer executable instructions stored thereon is executed by a processor to perform the systems and methods describe herein. The computer executable instructions comprise a software application that when executed by the processor configures the process to output a list of one or more inventory items available through a mobile storefront. This list may be produced on a display of an electronic communication device. The list of one or more inventory items available through a mobile storefront may be limited to those items available within the mobile storefront or may include those items available through pooled mobile storefronts, a warehouse, a product catalog, and/or the like. The software application further configures the processor to receive a selection of one or more inventory items from the list of one or more inventory items. The selection the one or more inventory items is made by a customer through a user interface of a customer electronic communication device. The software application may also configure the process to communicate an availability identifier of the one or more inventory items. The availability identifier may be communicated on a display of an electronic communication device, such as the customer electronic communication device. The software application also configures the processor to communicate the selection of the one or more inventory items to a mobile store distributor electronic communication device for an approval. The communication of the selection may be made on a display of the mobile store distributor electronic communication device and the approval may be made by the mobile store distributor through a user interface of the mobile store distributor electronic communication device. The software application further configures the processor to automatically change the availability identifier of the selected inventory item corresponding to the availability through an inventory compartment of a mobile storefront upon receipt of an authorization signal. The authorization signal may be the result of at least an approval received from the mobile store distributor electronic communication device.

These and other examples are described in more detail below.

BRIEF DESCRIPTION OF THE DRAWING

Various non-limiting examples are further described with reference the accompanying drawings in which.

DETAILED DESCRIPTION OF THE INVENTIONS

General Overview

Figure 1:
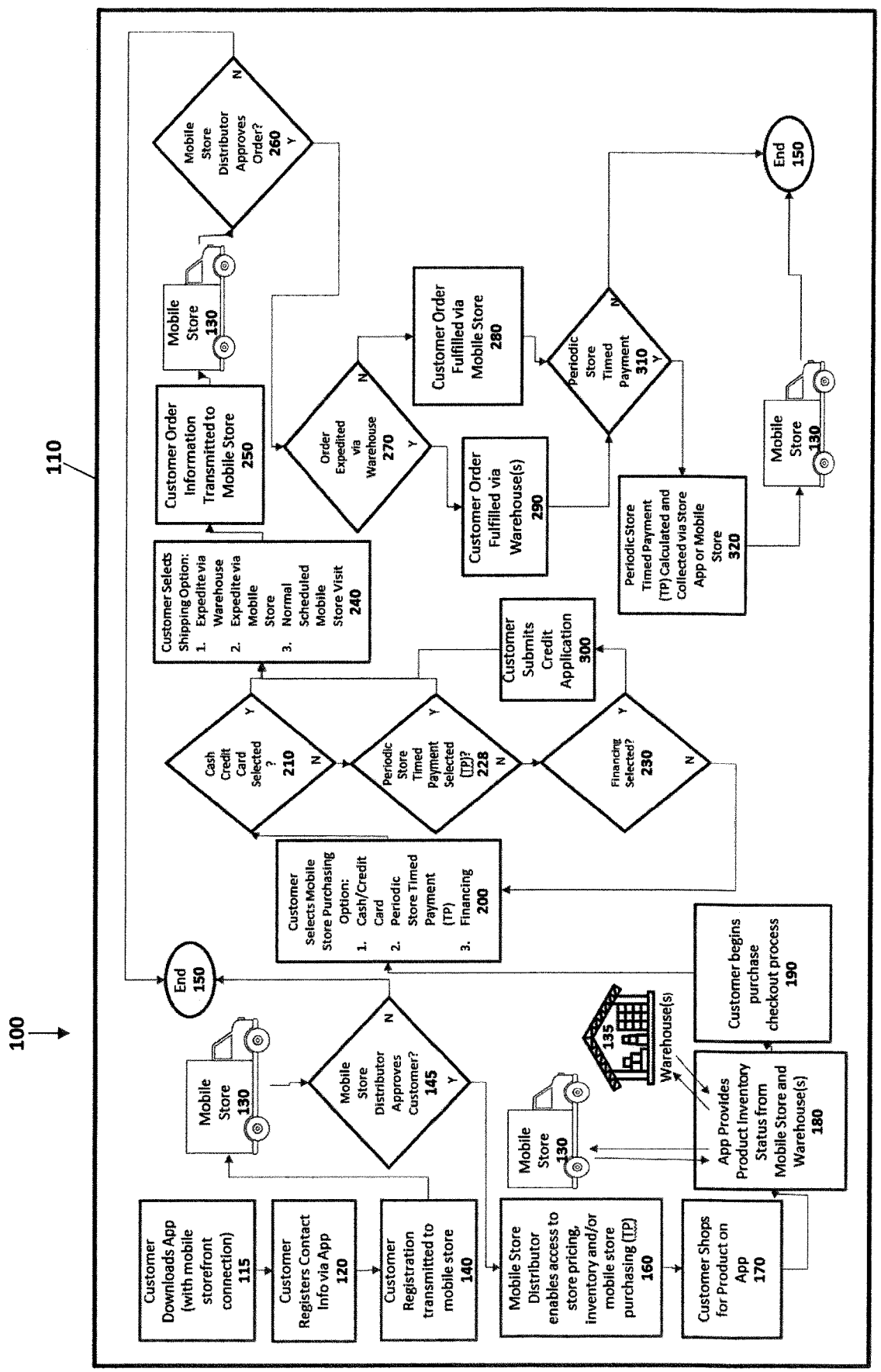
FIG. 1 is a block diagram of an exemplary, non-limiting example for a software application according to one or more aspects of the present disclosure.

Application programs (apps) are software programs or applications that are designed to run on a variety of computing devices such as computers, tablets, and handheld communication devices, such as smartphones. Such devices are referred to herein as electronic communication devices. The current state of apps have not lent themselves well to situations where complex interaction between multiple entities and parties is required. In particular, apps for use in customer, distributor, and store relationships for leveraging a DBS or franchise distribution model and, more specifically, a mobile storefront are not readily available. The present systems and methods provide novel and new inventive concepts for an app in a DBS or franchise distribution model. An example of a DBS may be a Point of Sale (POS) system. As described herein, the present DBS system provides inventive concepts and additional functionality over known POS systems. Additionally or alternatively, the DBS may utilize a POS system in combination with the additional features. In particular, the present application provides systems and methods for enabling customers to shop between world wide web channels and mobile storefronts at any time day or night during any day of the year. The particular inventive concepts are detailed throughout this disclosure. In particular, the system provides and synchronizes inventory item availability on the app correlated with customer demand, the mobile storefront inventory compartment, the mobile storefront distributor, and/or a manufacturer or warehouse. Also provided is a distributor purchase confirmation and approval process correlated with customer access and control of purchasing decisions.

In an example, the system generally includes customer access to distributor pricing and inventory availability in association with products, support or services associated with the products. The system may also include customer or distributor access to mobile store payment plans, such as, but not limited to, mobile storefront timed payments (TP), corporate financing, and payment services. Additional features of the system include customer access to detailed product information, product review, product service initiation, and product support such as, but not limited to, warranty claims and repair requests. An inventive concept of the new and novel system described herein is providing visibility and control to the customers and/or the mobile storefront distributor at all times, and to provide a direct link to view, access, and control the mobile storefront inventory availability in real time for all customers.

Each of the features for the systems and methods disclosed herein are performed by a software application used in combination with a mobile storefront. In particular, the software application of the present disclosure implements a service that enables access and management of inventory item availability through a mobile storefront in a customizable and cost-effective manner for the customer and/or the mobile store distributor. The software application may be performed across multiple electronic communication devices, unless stated otherwise herein. The software application may be stored locally on each respective device, on a single device, across multiple devices, through a single server, through multiple servers and/or over a cloud computing environment.

An electronic communication device, as utilized herein, may include any computing device such as an electronic machine including at least a computer processor and/or a computer memory. Exemplary electronic communication devices include, without limitation, a personal computer (e.g., desktop or notebook computer), a mobile device (e.g., smartphone, tablet device, a personal digital assistant, or substantially any portable, movable computing device), a wearable computing device (e.g., device having an optical head-mounted display, a wrist-mounted device, etc.), a server computer, and/or embedded computing devices of assets.

It is understood that the application(s) that are stored in the memory on such communication devices are executable by a processor and implemented in the form of software, in any suitable programming language. Software components are stored in memory on the device or accessed through the internet or cloud, and are executable by the processor. An executable program may be stored in any portion or component of the memory including, for example, random access memory (RAM), (SRAM), (DRAM), (MRAM), read-only memory (ROM), hard drive, solid-state drive, USB flash drive, memory card, optical disc such as compact disc (CD) or digital versatile disc (DVD), floppy disk, magnetic tape, or any other suitable like memory device. Although the systems and methods, including the inventory management application and other various systems described herein, may be embodied in software or code executed by general purpose hardware as discussed above, an alternative the same may also be embodied in dedicated hardware or a combination of software/general purpose hardware and dedicated hardware.

In the examples of the systems and methods, although the flowcharts show a specific order of execution, it is understood that the order of execution may differ from that which is depicted, or the operations may be executed concurrently or with partial concurrence, or skipped or omitted depending on the circumstances.

In one example, an electronic communication device for use by a customer or a mobile store distributor is described herein. The electronic communication device includes a user interface, a display, and a processor coupled to a computer-readable storage medium on the electronic communication device. The computer-readable storage medium stores computer-executable instructions for a software application for use in the present mobile storefront inventory control. The software application, when executed by the processor, configures the processor to output, on the display, the information communicated by the electronic communication device as further described below. The software application further configures the processor to receive, via the user interface, a selection of one or more inventory items as described below. In addition, the software application configures the processor to receive approval of the requested one or more inventory items from the mobile store distributor or others as described below. The software application further configures the processor to communicate the selection of the one or more inventory items to other devices for identifying availability and/or restocking of the selected inventory item as also described below.

The electronic communication device may further include a communication interface for receiving data associated with the inventory compartment, pooled inventory, and/or a warehouse. The communication interface, in one example, may include a receiver configured to record inventory items as they are transferred. In another example, the communication interface is configured to receive inventory data from other locations. In yet another example, the communication interface includes a receiver configured to track inventory items through an inventory monitoring interface operatively coupled to the inventory compartment.

Customer Application

The present application provides systems and methods for a mobile storefront having direct customer access to inventory and inventory control based on direct customer data, with the aid of a digital computer. A mobile storefront comprises an inventory compartment. The inventory compartment is a structure for displaying and/or transporting products for sale or service. As an example, in the automotive repair industry many of the products for sale through a mobile storefront are highly specialized and require support and repair services. In particular, a mobile storefront is critical to the operations of the repair service industry and the mobile storefront has to deliver the products, support, and services to make such operations work effectively. In the mobile storefront serving the automotive repair industry, for example, the inventory compartment of the mobile storefront may additionally provide an area to demonstrate products, service products, and provide the necessary support for a product at the point of sale. Further, the mobility of the inventory compartment and mobile storefront allow each of these functions to occur at the point of sale, which includes, but is not limited to, a customer's location, event or otherwise.

In order for a customer to perform the method of operation for the present systems and methods, the customer must access or must download the software application. The software application may be made available through online retailers such as the Google Pay store, other Android app providers, the Apple Store, and/or other services that host apps. Through the software application, the supply entity, such as the DBS, franchise distributor, or the like, notifies a mobile store distributor of a list of pending customers waiting for approval. The mobile store distributor can approve access, allow access to inventory and/or pricing, enable mobile store pick-up, and approve purchases. The mobile store distributor or other entity maintains full access and control of the system and can enable or disable customer access via the platform.

In this example, upon approval by the mobile store distributor, the inventory items available through an inventory compartment of a mobile storefront may be viewed and selected at any time by a customer through an electronic communication device. The electronic communication device communicates the most current information from the mobile storefront to the customer for utilization of the inventory compartment of the mobile storefront. This information may include, but is not limited to, inventory availability (whether within the mobile storefront or elsewhere in the franchise distribution model or locality), pricing, payment options, financing options, payment collections, service requests, support information, repair status, warranty status, service and support calendars, marketing data, promotions, preorder capabilities, and various functions to enhance the ability of the customer to order products or services. The present disclosure provides systems and methods for inventory control with omnichannel or omnipresent full-time availability instead of a physical visit, such as at a minimum of once a week. Each of these will be discussed in greater detail below.

Through the electronic communication device the customer may view current or needed inventory items, such as products and/or services currently available within the mobile storefront based upon their needs. If the inventory item is in stock, or is a stocked inventory item, within the mobile storefront the customer may select that inventory item, thereby, reserving the inventory item through the electronic communication device. If a customer has a product service request, the system and methods may also note whether an inventory space is available for a product service request (e.g. transporting a product requiring repair), which can also be identified for selection through the electronic communication device by the customer.

In an example, the software application communicates the selection of the selected inventory item to a mobile store distributor electronic communication device. The mobile store distributor is the operator of the mobile storefront. The mobile store distributor may be provided the option for approval before the selected product is reserved for the selecting customer. Several considerations may be made in the approval process. The approval may come directly from the mobile store distributor, or may be provided by another party in the transaction, such as another mobile store distributor or the like. The approval may also require review and approval of that particular customer such as, but not limited to, review of prior payment history, prior purchase history, customer status, and the like. The approval may additionally require confirmation of payment or confirmation of financing. Each of these functions may be performed by the software application through the electronic communication device to other electronic communication devices in the system.

Upon approval by the mobile store distributor, the availability of the selected inventory item is automatically changed with respect to that particular mobile storefront. By example, inventory of the selected product is either reduced or identified as being unstocked or unavailable when viewed by a subsequent customer. Likewise, available inventory space for a repair request is either reduced or identified as being unavailable when viewed by a subsequent customer. But, as will be described further, the system and methods may also access the inventory of other mobile storefronts, other distributors or even the manufacturer to see if inventory may be available that would satisfy a customer request.

Thus, the availability of the selected inventory item may be further communicated by the software down the DBS or franchise distribution chain based under the current systems and methods. By example, upon reserving the selected item from within a mobile storefront the product availability at the warehouse changes in order to restock that particular item within the mobile storefront upon return to the warehouse. This may occur automatically. In another example, this process may require further approval through the software by a party in the DBS, such as by the warehouse, and/or other mobile storefronts. This additional approval may occur prior to restocking the mobile storefront based upon product demand, product sales, product location. Thereby, the inventory may not automatically change until the respective approvals are achieved through the system which was first initiated by the customer at the point of selection of the inventory item.

The systems and methods of the present disclosure may further approximate demand for products, or limit the products and services, with respect to a particular customer. By example, based upon the customer's operation or prior demand, the future demand of certain products or services can be approximated and supplied to the mobile storefront to be ready for the future demand. The flexibility provided by the systems and methods allow a mobile storefront to be ready to serve its customers. In addition, the mobile storefront can identify promotions or new products that may be determined to be of potential interest to a customer, and target the customer with related information. The ability to direct marketing information, promotions, or notifications of new or upcoming products to a particular customer based on knowledge of the customer's needs will enhance the relationship with the customer. Moreover, inventory availability, pricing or other features might also be controlled by or based on the particular customer. The system and methods may also control accessibility of a customer through the system. These accessibility parameters may be determined by the customer, the mobile store distributor, or elsewhere in the DBS or franchise distribution chain. Further, this provides a mechanism for the customer, the mobile store distributor, or the DBS to limit accessibility at the electronic communication device of the customer for high risk purchases (e.g. financing, safety, cost, etc.) or for purchases unrelated to the customer's operation. Further, this also provides a mechanism for the customer, the mobile store distributor, or the DBS to limit and/or communicate accessibility based upon warranty status, such as upon warranty expiration, wherein a warranty request may not be requested upon expiration of warranty. Each of these accessibility limitations also provide the flexibility to prevent an inventory item from being inadvertently purchased by an unapproved employee of the customer or other individual. This further reserves or isolates the available inventory for those customers requiring such inventory and, thereby maintains the availability of the inventory item within the inventory compartment of the respective mobile storefront.

The systems and methods of the present disclosure may also improve the ability of a mobile storefront or other distributor to provide services and support to its customers, such as on a regular schedule. This provides the mobile storefront the ability to interact with the customer in a manner that is not available through e-commerce and/or brick and mortar storefronts. Through the electronic communication device, the customer may select availability or schedule a service and/or request support. Like inventory within an inventory compartment, each service or support item is identified as available for selection based upon the availability, scheduled visit, and/or location of the mobile storefront and mobile store distributor relative to a customer. Further, availability of the service or support item may be determined by customer's current demand or by demand for repairs or other services or support by others in the DBS. Space within the inventory compartment, such as for repairs, transporting a product requiring repair, service, and/or support, may also be indicative of an availability for a corresponding inventory items or space.

Like service and support requests, warranty and repair claims may also be requested by the customer through the electronic communication device. Inventory items may be available or limited to a respective customer by the term of a warranty on a certain product or by an existing claim. Like the service and support requests, warranty and repair claims may be identified similar to an inventory item and may additionally be available or limited based upon the availability, scheduled visit, current demand, space within the inventory compartment, and/or location of the mobile storefront and mobile distributor relative to the customer for example. In the view of expense of broken tools and equipment, repair shops can lose revenue when a tool or piece of equipment is out of service. A mobile storefront using the current system can save time by expediting the service or repair of the broken tool by having a replacement immediately available for the customer without having the customer leave their premises.

Another distinctive feature of the systems and methods provide the customer with the ability to communicate issues with a product that may be encountered, to allow the mobile storefront the ability to properly respond to the customer. For example, in the automotive repair industry, the systems and methods may provide a software module, such as a broken tool wizard, made available to the customer through the electronic communication device. The broken tool wizard may provide functionality for either a customer, a technician, a repair professional, a mobile store distributor, and/or any other party in the DBS to assist in the repair of a broken tool. Ideally, a customer or technician is able to submit information relating to a broken tool through the electronic communication device, such as by images, video, audio or other suitable form. The application may even offer the ability for video or audio connection directly to a technician or a repair professional to evaluate the situation. This information is sent directly to the mobile store distributor, a repair professional, and/or any other party in the DBS through the software application. Particular features of the broken tool wizard may allow the customer or technician to identify the nature of the problem or broken item, provide a description of the broken item, provide a description of the damage, submit one or more pictures/video or the like, to effectively communicate the issues with the broken tool to be serviced or repaired. Upon receipt of the information, the mobile store distributor, a repair professional, and/or any other party in the DBS reviews and approves the information submitted by the customer or technician. As a result of the approval, the system and methods may schedule a support or service appointment, or schedule to pick up the damaged tool for repair or replacement. The system also allows the compilation of information regarding broken or damaged goods to facilitate making improvements or other response to problems that may be identified with a particular product.

The electronic communication device may also provide the customer the availability to request an expedited delivery service for a product or service. Such a request may be made to override inventory item availability selected by other customers, based upon an indication of the other customer's demand. Expedited delivery service may also be accomplished through inventory pooling, as further described below, and/or directly from the warehouse or other inventory. Upon a customer making an expedited request, the mobile storefront can determine if the request can be fulfilled and communicate an offer to the customer in relation to the requested product or service, such as information on costs and timing for approval by the customer.

The systems and methods may also provide a customer many options for payment for products or services via the electronic communication device. For example, a customer can pay for a product or service using any suitable payment systems, such as PayPal, Google Pay, Apple Pay or like services for example. Alternatively, the customer may be offered financing of some sort, such as timed payments (TP) or other approaches. Financing a customer's purchase of goods or services may be offered by any party in the DBS, such as by the manufacturer, corporate store, a distributor, a franchisee, mobile store distributor, or any other suitable party.

The present systems and methods also offer unique financing alternatives through the software application where the mobile store distributor extends credit and collects a weekly payment through the DBS. This allows the mobile store distributor to extend small amounts of credit where the customer may not have credit available through other means. If the amount needed for purchase exceeds the amount of credit available that the mobile store distributor is willing to extend, the mobile store distributor can propose corporate financing and coordinate the application and approval through the mobile storefront system. Alternatives using a combination of financing through the combination of the mobile store distributor and corporate can also be provided. Once the finance accounts are established, the mobile storefront system manages the collections interface and can freeze or extend credit based on customer needs or behavior.

An example of such an approach is through a mobile store timed payment (TP). A TP arrangement establishes down payment terms, payment schedule, and interest charges. The system and methods may allow a party requested to provide financing to a customer to check a customer's credit or other information on which to make a decision to extend financing to a customer. If a request for financing is accepted, the distributor or other party may communicate the TP or other terms through the electronic communication device to the customer, the mobile store distributor, or other party of the DBS to identify the status of these terms, schedules, and charges for the customer. The system and methods then allow the distributor or other party that extended credit to a customer to collect and monitor payments for compliance with the terms of the arrangement. In the event of late payment, non-payment, or the like, the system and methods may provide an alert to the distributor to communicate with the customer or possibly restrict access to other products or services by that particular customer, until payment terms are rectified. The mobile store distributor may communicate this negative status to the customer through the electronic communication device. By example, a customer may receive a "Account Frozen," a "No Credit," or other suitable message and may further be prompted to call or communicate with the mobile store distributor or other DBS party. The system and methods may also provide the mobile store distributor or other DBS party access through an electronic communication device to approve the financed purchase or set a limit to financing available to a customer, or to auto approve a financing request for a particular customer. The accessibility to inventory items may be determined, communicated, or approved by the mobile store distributor, any other party of the DBS, or a combination thereof. Moreover, accessibility of inventory items to a customer may additionally be based upon the performance of the mobile store distributor as determined by any other party of the DBS.

The electronic communication device may further provide a TP calculator. The TP calculator will estimate and communicate the payment terms for a TP sale between the distributor and customer. This includes, but is not limited to, down payment, repayment schedule, and interest charges.

The TP calculator may calculate estimated payment options based on set periods, such as weekly, which may ultimately influence immediate purchase decisions by the customer.

Another option for payment may be through a business account. The electronic communication device may communicate to the customer, the mobile distributor, and/or any other party of the DBS the status of the business account and/or any corporate financing balances when the system of the electronic communication device is first initiated and/or at the time of selection of one or more inventory items. Moreover, direct payments may be received through the electronic communication device sent directly to the mobile store distributor, a third party payment processor, and/or any other party of the DBS.

The following is an example of corporate financing where a customer can purchase products using an extended form of financing. A corporate financed purchase transaction is a retail sale. The DBS operator retains a collateral interest in the merchandise until the customer makes the required number of finance payments. After a prescribed number of finance payments, ownership passes to the customer. The customer may be provided the option of purchasing the product for a cash pay-off amount during the finance period for example, or return the product before ownership transfers. Each of these are input, calculated, or scheduled by the present methods and systems. Further, the finance-purchase details may be facilitated and communicated through the electronic communication device.

Still yet another feature of the systems and methods of the present application is direct communication between the customer or technician and the mobile store distributor through the electronic communication device. A customer or technician may communicate by way of text, audio, or video messaging for example. Providing the customer and/or technician the ability to transmit messages directly between one another and/or to the distributor point of sale system through the electronic communication device enhances the ability to serve the customer. In response, the mobile store distributor is provided the ability to communicate back through the electronic communication device via the software application to respond to questions about sales, service, and product information. Segmented or group messages may also be accomplished by either or both parties to other designated parties to promote product sales and services and/or to share product reviews or other information.

Mobile Store Distributor Application

As described above, the mobile store distributor additionally maintains control of the systems and methods of the present disclosure. The mobile store distributor additionally utilizes an electronic communication device to communicate between the electronic communication device of the customer, the inventory within the inventory compartment, and other parties of the DBS. As used herein, the mobile store electronic communication device and the mobile store distributor electronic communication device are used interchangeably. The present disclosure provides a software application that performs these functions across these multiple devices. From the mobile store distributor perspective, the mobile store distributor is provided control of customer approval and handling through an electronic communication device. Customer approval will be initiated with the mobile store distributor upon receiving notice from the DBS that a new customer has accessed or purchased the app. In addition, the mobile store operator can set up parameters to automatically approve the customer based on a predefining setting or rules. Upon receipt, the mobile store distributor can establish a customer relationship and allow full functionality in providing goods or services to the new customer.

Arrangements set forth by the mobile store distributor through the electronic communication device may be based upon customer, location, promotions, inventory, service capabilities, or the like.

The systems and methods also allow for effective response to customer demands in such a distributor system. As a particular mobile storefront only has limited space for inventory of products, distributors can work together to supply products or services effectively. Such a feature enables for example, a first local distributor to link to a second local distributor in the event that a customer immediately requires a particular item, which is not available from the first distributor. The ability to pool inventory enhances the business of each distributor, and the customer is able to purchase the item as needed. A particular advantage of such a feature is that the customer is able to immediately fulfill a need from a company distributor rather than purchasing from an alternate source. The mobile store system will also facilitate the transfer of inventory from one mobile store to another.

The inventory of an item may be held by a multiple mobile storefronts in a local region for example, which can be contributed to a common pool of inventory between the mobile storefronts in the particular local region. Fulfillment of an order placed by a customer of a mobile storefront is provided from the pooled inventory of the item through one of the mobile storefronts, with the supplying mobile storefront receiving agreed to compensation for the goods or services sold. This may provide the mobile storefronts the ability to better provide desired goods to their customers by combining resources. The mobile store distributors may establish inventory pooling through the systems and methods and via electronic communication devices. Such a feature enables a mobile storefronts in a region to quickly supply products or services to a customer. The purchase may still be made directly through the first mobile store distributor after being supplied by a second distributor or alternatively, the purchase may be made directly through the second mobile store distributor if desired. The systems and methods may be set up by the mobile store distributor to allow the customer access and identify the second mobile store distributor or identify the available inventory as inventory through the first mobile store distributor only. Multiple mobile store distributors may be included in inventory pooling. Based on customer demand or other variables in a region, product-location combinations may be designated as inventory buffers, where one or more of the mobile store or other distributors carry inventory buffers to reduce the effects of variability in the supply chain. The systems and methods can optimize inventory based on the particular characteristics of the region and customers for example.

The mobile store distributor may also provide certain customers access to preview and preorder upcoming new products and to take advantage of special promotions. This is controlled by the mobile store distributor through an electronic communication device for example. This provides the mobile store distributor the opportunity to provide enhanced service to favorable customers while also managing the inventory within the inventory compartment upon release of the new or promotional products.

In addition to the functionalities described under the present heading, the mobile store distributor may be provided additional control over those features imparted upon the mobile store distributor as described under the heading for "Customer Application," above.

Examples of a Mobile Storefront Inventory Control

FIG. 1 shows a block diagram illustration of an exemplary, non-limiting example of the systems and methods described herein. Specifically, FIG. 1 illustrates a system 100, which implements the software application for use by distributors and customers to control distribution of goods or services to a customer, such as through a mobile storefront. One or more computing devices are utilized for implementing the software application represented as an app 110 with various functionalities. As illustrated by FIG. 1 at 115, a customer downloads or accesses the app. The app 110 contains a connection to at least one mobile storefront 130. In operation, the app 110 may determine the location of the customer that downloaded the app, or may have the customer register with contact and other information at 120, by way of an electronic communication device. Using this information, the app 110 may automatically identify the mobile store distributors 130 or other distributors in a local region. The app 110 can then automatically transmit the customer registration to one or more local mobile storefronts 130 and the mobile store distributor can communicate with the new customer and enable access to full or partial functionality of the systems and methods such as noted previously at 140 by way of an electronic communication device. If a customer is not approved at 145, access is denied and the software application terminates the transaction 150. If customer access is approved at 145 the mobile store distributor enables customer access to store pricing, inventory, and/or mobile store purchase (TP) or other features at 160 available through the software application by way of an electronic communication device.

As further illustrated by FIG. 1, upon approval the customer may begin to shop for products or services on the app at 170. The app may provide product inventory status from one or more mobile storefronts 130 and/or warehouse(s) 135 or the like (such as a distributor inventory and/or a manufacturer inventory) at 180. This is accomplished by having the software communicate directly with the information collected from the mobile storefront 130 and/or the warehouse(s) 135 as a result of data produced by the DBS, the mobile store distributor, the warehouse(s), and activity by other customers. Upon identifying the desired inventory item and its availability, the customer begins the purchase checkout process 190 and may select from mobile store purchasing options 200, such as including cash, credit card, TP, financing, business account, or the like.

FIG. 1 further illustrates the operation based on selection of a payment option. In particular, upon selecting and completing the cash or credit card options 210 through the electronic communication device the payment is processed by the software or by a third party payment service. Alternatively, the customer may select the TP option 228 through the electronic communication device, or a financing option 230 for example.

Upon selection of the payment option, FIG. 1 illustrates the operation of the software application 110, such as to provide the customer shipping options 240 in the event of immediate payment by cash or credit card at 210, through the electronic communication device. Shipping options may include expedited shipping via the warehouse(s), expedited shipping via the mobile store, or normal scheduled mobile store visit or other possible options. The customer order, including each of the parameters above, is then transmitted 250 to the mobile storefront 130 by the software application where the mobile store distributor may access it thorough an electronic communication device. Using the electronic communication device at the mobile storefront, the mobile store distributor approves or denies the order using the software application at 260. If the order is denied the software application terminates the transaction 150. If the order is approved, the mobile store distributor 130 manages and tracks the orders for delivery to the customer. If the purchased product is not in the mobile store distributors inventory, and/or the customer selects expedited delivery or the like, the mobile store distributor may initiate fulfillment via the warehouse(s) 270, for fulfillment via the mobile store at 280 or the warehouse at 290 through the software. The inventory can automatically be adjusted at the mobile storefront and/or warehouse upon fulfillment of the customer's order. If a payment option for TP or financing is selected at 220 or 230, the app requests a credit application which is submitted at 300. Upon approval of the TP or financing, the TP or financing terms, calculation, schedule, and status is communicated to and approved by the customer. Upon approval, the customer can then select a delivery option at 240 and fulfillment is achieved in the same manner as with a cash or credit card payment. Through this entire process, the inventory item status within the inventory compartment is continuously updated and communicated for access by other customers in real time. Further, inventory control can be automatically implemented for restocking the inventory if desired. In the event a TP or financing option is selected and approved, upon fulfillment of the order, monitoring the TP or financing at 310 is performed, and payment collected by the mobile store distributor via the app 110 or directly from the customer at 320.

Figure 2:
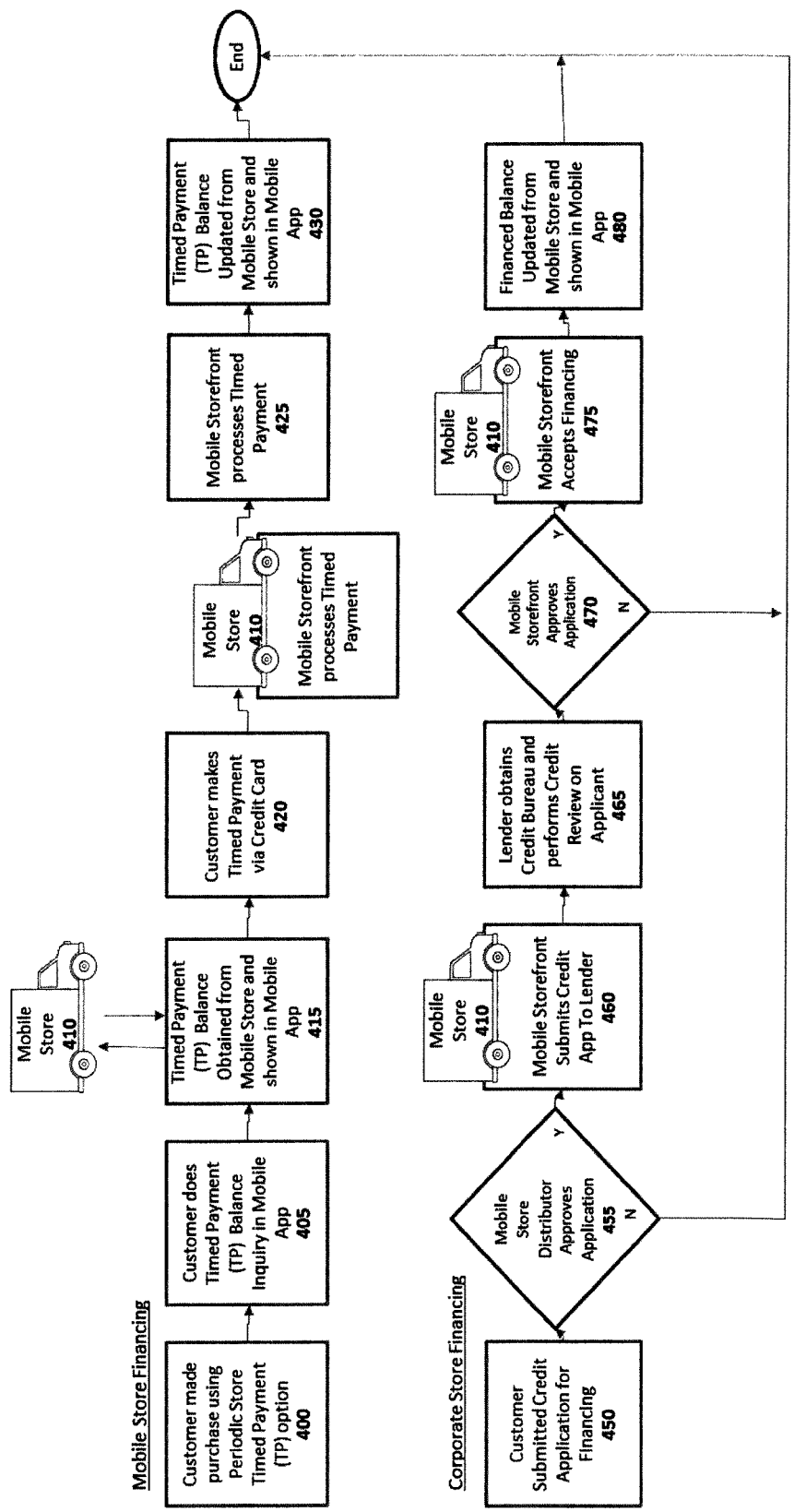
FIG. 2 is a block diagram of an exemplary, non-limiting example for a software application according to one or more aspects of the present disclosure.

Turning to FIG. 2, exemplary examples of the financing options are illustrated in greater detail. Before making any changes to the inventory item availability, payment or financing, as illustrated by FIG. 2, must be secured and approved through the software application. TP is a financing option provided through the mobile store distributor, acting as a financier for example. In other words, TP is an example of mobile store financing. In FIG. 2, a customer makes a purchase using the TP option 400. In implementation, the customer can then access via the software application, a TP payment balance inquiry at 405 and communicates the same to the mobile store distributor at 410. The mobile store distributor produces a timed payment calculation and returns the same to the electronic communication device of the customer at 415. The software application then allows the customer to make the TP via credit card at 420 or other payment option which is ultimately processed by the mobile store distributor 410 using the software at 425 or by a third party payment processing service. The TP balance is updated at 430 by the software and communicated to the electronic communication device of the customer.

Also illustrated by FIG. 2 is an exemplary example of financing through a DBS party. DBS is an example of corporate store financing. To initiate DBS financing, the customer must submit a credit application at 450 into the software application using the electronic communication device. The mobile store distributor receives the credit application and can approve or deny the request at 455 using the software application. If the credit request is denied, the process is terminated by the software application. If the credit request is approved by the mobile store distributor, the mobile store distributor submits the credit application to a lender at 460, such another DBS party or the manufacturer for example. The lender processes the credit application at 465, and approval is granted or denied at 470 through the software application. If the credit application is approved by the lender and financing is accepted by the mobile store distributor 410 at 475, the mobile store distributor can fulfill the order and monitor and receive payments via the app with a customer at 480. Status of the account and inventory can be automatically updated accordingly in real time. Given the above functionalities, the app enables, among other things, order fulfillment and expedited delivery for mobile storefronts via the mobile app and point-of-sale systems, periodic timed mobile store payments, payment collection for mobile store and corporate financed accounts for mobile storefronts, initiation of services and support, warranty claims and repair requests for example. The systems and methods achieve the technical effect of enabling a mobile store distributor to have complete access and control of their transactions between the mobile store and customer. Additionally, the mobile store distributor has complete access control of its transactions between mobile store and customer, including credit limits and approval workflows and a timed payment calculator, which provides estimated payment options based on weekly or set periods in comparison to total price, to provide flexibility to the customer and/or influence purchase decisions for example.

The presently disclosed systems and methods are described in examples as implemented by a mobile storefront with direct inventory control based on sales to customers in real time as follows. The mobile storefront comprises an inventory compartment, an electronic communication device, and a processor. The processor is coupled to a computer readable storage medium with computer executable instructions stored thereon. The computer executable instructions are for use in controlling inventory in the inventory compartment of the mobile storefront. The computer readable instructions, when executed by the processor, configure the processor to receive a selection of one or more selected inventory items. The selection is received through the electronic communication device from a selection made through a customer electronic communication device and implemented by a software application. The computer readable instructions, when executed by the processor, further configure the processor to communicate the selection of the one or more selected inventory items to a mobile store distributor for approval. This communication may be performed through the electronic communication device. The computer readable instructions, when executed by the processor, additionally configure the processor to automatically change an availability identifier in the system of the selected inventory item within the inventory compartment upon receipt of an authorization signal. The authorization signal is a result of the mobile store distributor approval for example. In a further example, the inventory compartment may utilize product identifiers to automatically track and control inventory, wherein upon removal of a product from the inventory compartment, the inventory is automatically updated by the system. A mobile storefront may include one or more terminals to allow a user to either browse electronically various items for selection and/or sale, or access a self-service check-out station to complete a transaction. A plurality of terminals can be coupled to communicate with a master server terminal over a wired/wireless network. A point of sale (POS) computer processes a transaction between a customer and a sales representative. The POS computer includes a graphical user interface (GUI) allowing a user to display product information. In addition, the POS computer calculates prices, manipulates customer information, processes orders, accesses inventory, processes transactions, and stores data. Other computers may be located in the mobile store to facilitate other activities, such as accounting, payroll, and inventory control. The computers can store data regarding pricing, inventory, purchase orders, customer and employee information, transactions from the POS computers, and other data used for the store's daily operations. In addition, the database can be accessed by the store computers and their associated memories. The POS management system may also be connected with the other mobile stores' computers to form a network where the mobile stores can exchange information between stores such as in the present DBS system. In an example, the mobile store may have a self-service sales terminal to allow customers to select and purchase goods directly. A customer can browse products directly in the mobile store and/or electronically and select various products for purchase, review or check out. Upon customer selection of an item for purchase, the check-out station would automatically request or retrieve these items from the inventory compartment for check out. In an example, the self-serve check-out station would communicate via a network interface to automatically update inventory or other information. The DBS system can perform auditing and daily reporting as may be desired. The purpose of auditing and daily reporting is to provide the mobile store a way of generating reports, which can be used to audit business processes.

The availability identifiers for the one or more selected inventory items may be one of the following: one or more stocked inventory items within the inventory compartment; one or more stocked inventory items within a partner inventory compartment; one or more stocked inventory items available through the mobile store distributor; one or more inventory items available through a warehouse, and/or unavailable. Further a quantity identifier for the number of available selected inventory items may be provided and/or automatically changed for each. In one specific example, the inventory item is one of a product, a service request, a support request, and a warranty request. Further, an inventory item for a service request, a support request, and/or a warrant request may correspond to an availability identifier for available inventory space within an inventory compartment for transporting a product requiring service, support, or a warranty claim for repair or replacement. Additionally or alternatively, an inventory item for a service request, a support request, and/or a warranty request may designate an availability inventory identifier for a scheduled visit, an expedited visit or schedule of an mobile store distributor.

Further, the software application may further automatically communicate the sale of the one or more selected inventory items to a warehouse within the DBS for stocking or restocking the one or more selected inventory items in the inventory compartment. Further, upon confirmation of stocking or restocking, the software may automatically change the availability identifier of the selected inventory item as communicated to the customer through the customer electronic communication device.

The present example may be further modified with a payment structure. The authorization signal may further require a confirmation for an authorization for payment or financing. This authorization may be granted through the software by a DBS party or may be communicated to a mobile store distributor through the electronic communication device. Only upon approval through the electronic communication device by the mobile store distributor is the authorization granted. The authorization for payment may be one of a direct payment, a timed payment, a payment withdrawn from a corporate account, a financed payment, and a third-party payment through a third-party payment service.

A software application may be implemented for direct customer control of the inventory for a mobile storefront as follows. A non-transitory computer readable medium with computer executable instructions stored thereon is executed by a processor to perform the systems and methods describe herein. The computer executable instructions comprise a software application that when executed by the processor configures the process to output a list of one or more inventory items available through a mobile storefront. This list may be produced on a display of an electronic communication device. The list of one or more inventory items available through a mobile storefront may be limited to those items available within the mobile storefront or may include those items available through pooled mobile storefronts, a warehouse, a product catalogue, and/or the like. The software application further configures the processor to receive a selection of one or more inventory items from the list of one or more inventory items. The selection the one or more inventory items is made by a customer through a user interface of an electronic communication device. The software application may also configure the process to communicate an availability identifier of the one or more inventory items. The availability identifier may be communicated on a display of an electronic communication device, such as a customer electronic communication device. The software application also configures the processor to communicate the selection of the one or more inventory items to a mobile store distributor electronic communication device for an approval. The communication of the selection may be made on a display of the mobile store distributor electronic communication device and the approval may be made by the mobile store distributor through a user interface of the mobile store distributor electronic communication device. The software application further configures the processor to automatically change the availability identifier of the selected inventory item corresponding to the availability through an inventory compartment of a mobile storefront upon receipt of an authorization signal. The authorization signal may be the result of at least an approval received from the mobile store distributor electronic communication device.

The software application may further automatically communicate the approval of the one or more selected inventory items to a warehouse within the DBS for stocking or restocking the one or more selected inventory items in the inventory compartment. Further, upon confirmation of stocking or restocking, the software may automatically change the availability identifier of the selected inventory item as communicated to the customer through the customer electronic communication device.

The software application may further communicate distributor pricing for the one or more inventory items to a customer electronic communication device as further detailed by the systems and methods described herein. The distributor pricing may be established by a mobile store distributor through the mobile store distributor electronic communication device with parameters based upon a user identification corresponding to the customer and/or the customer electronic communication device. Likewise, the availability identifier of the one or more inventory items may additionally be established in the same manner based upon a user identification corresponding to the customer and/or the customer electronic communication device. The same may be utilized to establish financing, promotions, product presale, service schedule, or the like.

The software application may further include a payment authorization confirmation for issuing an authorization signal. In particular, the authorization signal may further require a confirmation for an authorization for payment or financing. This authorization may be granted through the software by a DBS party or may be communicated to a mobile store distributor through the electronic communication device. Only upon approval through the electronic communication device by the mobile store distributor is the authorization granted. The authorization for payment may be one of a direct payment, a timed payment, a payment withdrawn from a corporate account, a financed payment, and a third-party payment through a third-party payment service.

Like above, the availability identifiers for the one or more selected inventory items may one of the following: one or more stocked inventory items within the inventory compartment; one or more stocked inventory items within a partner inventory compartment; one or more stocked inventory items available through the mobile store distributor; and/or one or more unstocked inventory items available through a warehouse. Further a quantity identifier for the number of available selected inventory items may be provided and/or automatically changed for each. In one specific example, the inventory item is one of a product, a service request, a support request, and a warranty request. Further, an inventory item for a service request, a support request and/or a warrant request may correspond to an availability identifier for available inventory space within an inventory compartment for transporting a product requiring service, support, or warranty claim for repair or replacement. Additionally or alternatively, an inventory item for a service request, a support request, and/or a warranty request may designate an availability inventory identifier for a scheduled visit, an expedited visit based upon a moment in time or schedule of an mobile store distributor.

Examples of Electronic Communication Devices

Figure 3:
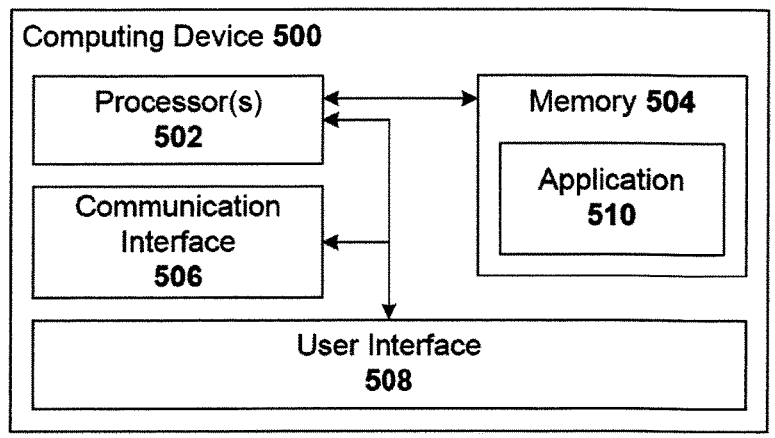
FIG. 3 is a block diagram of an exemplary, non-limiting computing device according to one or more aspects of the present disclosure.

Turning to FIG. 3, a block diagram of an exemplary, non-limiting example of an electronic communication device 500 is illustrated. Electronic communication device 500 may serve as an exemplary device for implementing the electronic communication devices described above. Electronic communication device 500 includes one or more processor(s) configured to execute computer-executable instructions such as instructions composing the application 510. Application 510, for example, can be software application as described above. Such computer-executable instructions can be stored on one or more computer-readable media including a non-transitory, computer-readable storage medium such as memory 504 of electronic communication device 500.

Electronic communication device 500 includes a communication interface 506, which can be utilized to communicatively couple the electronic communication device 500 to other electronic communication devices and/or to servers (remote systems). As schematically depicted and described herein, a "communication interface" refers to a logical interface through which communication between at least two entities is established and conducted. The communication interface incorporates an address or identifier to which transmission can be directed for reception by the entity utilizing the interface. The address or identifier also serves to identify an origin for transmission from the interface. As a logical interface, the communication interface 506 can include one or more protocols enabling the communication. These protocols can be layered (e.g., according to the OSI model). Further, these protocols can vary depending upon the medium of transmission. For example, the communication interface 506 can utilize a wired or wireless medium. To this end, as utilized herein, the communication interface 506 also includes physical interfaces and transmit/receive processing chains to implement the communication via the medium. For example, the communication interface 506 can include physical wired or wireless interfaces such as, but not limited to, a USB interface, a serial interface, a WiFi interface, a short-range RF interface (Bluetooth), an infrared interface, a near-field communication (NFC) interface, an Ethernet interface, a fiber optic interface, a cellular radio interface, a satellite interface, etc.

Electronic communication device 500 can further include a user interface 508 that comprises various elements to obtain user input and to convey user output such as displays and input devices (e.g., keyboards, pointing devices, etc.). As utilized herein, user interface 508 includes graphical user interfaces displayed by output devices (e.g., displays) and interacted with by users via input devices. Graphical user interfaces can be generated by application 510.

Figure 4:
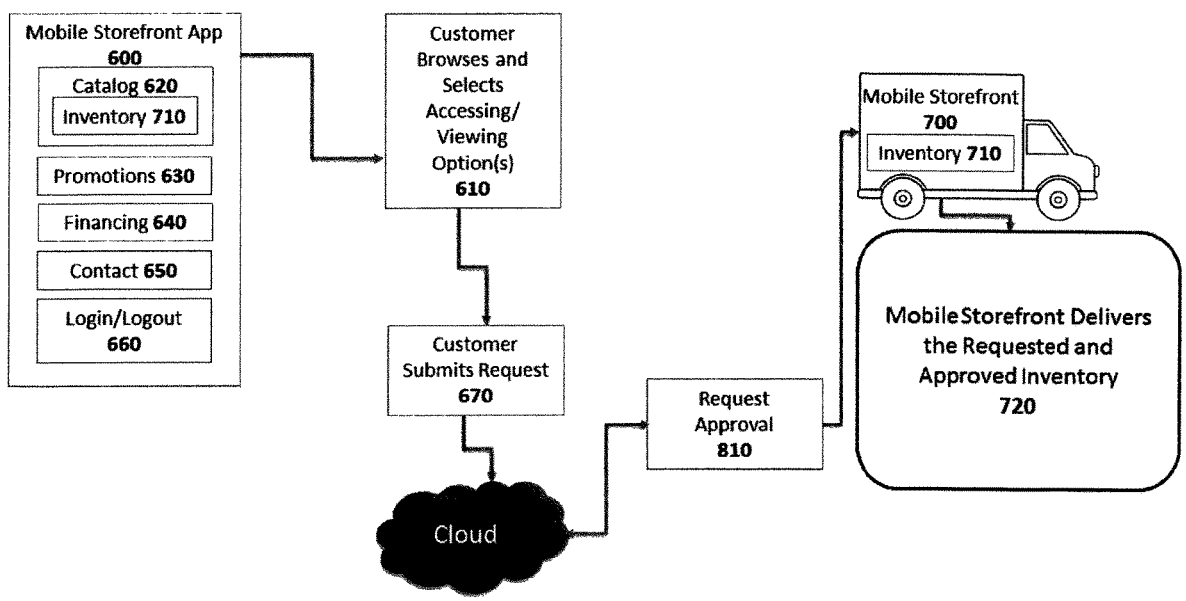
FIG. 4 is a block diagram of an exemplary, non-limiting example of the implementation of the present systems and methods through an electronic communication device.

Turning to FIG. 4, one example of the system as implemented through an electronic communication device is illustrated. An app 600 is available through an electronic communication device. Upon accessing the app 600 a customer may browse and select from various options. Examples of the options include accessing and/or viewing a catalog of inventory items 620, accessing and/or viewing promotional fliers 630, accessing and/or viewing financing options 640, accessing and/or viewing mobile storefront contact information 650, accessing and/or viewing account information 660, and/or accessing and/or viewing login information 670. In this particular example, the customer accesses and/or views the catalog 620 where the customer is provided access to the available inventory 710 of a mobile storefront 700 through the catalog 620. The inventory includes the available products and/or services and provides the necessary level of detail as described in the present disclosure. Through the app 600, the customer submits a request 670 for the available inventory item(s) 710. The request for the available inventory item(s) is communicated from the electronic communication device to the DBS, and/or the mobile storefront 700, for review and approval 810. Such a request may be facilitated through a POS system and/or directly with the mobile storefront. In this particular example, the request is communicated to the mobile storefront 700 through the cloud. Upon approval, a status, or availability, of the requested inventory item(s) 710 is updated within the mobile storefront 700 and catalog 620 of the app 600 and the mobile storefront 700 delivers the requested and approved inventory item(s) 720.

Examples of Server Devices

Figure 5:
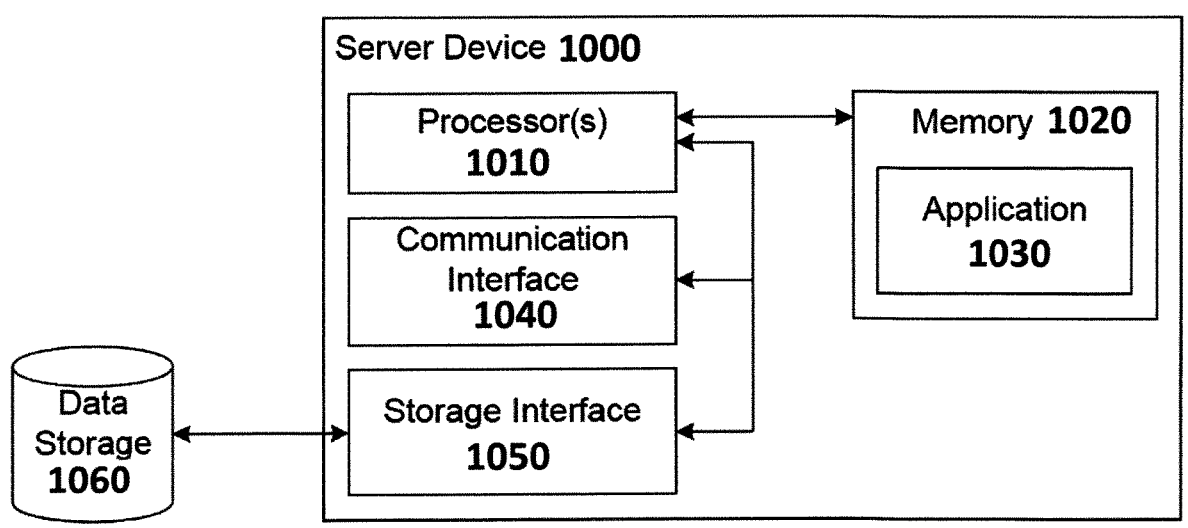
FIG. 5 is a block diagram of an exemplary, non-limiting server in accordance with one or more aspects of the present disclosure.

FIG. 5 illustrates a block diagram of an exemplary, non-limiting example of server device 1000. Server device 1000 can be a server of support system described above. As shown, server device 1000 includes one or more processors 1010, a memory 1020 storing application 1030, a communication interface 1040 and a storage interface 1050. The communication interface 1040 can be utilized to communicate with one or more devices such as electronic communication device 500, as shown in FIG. 3, via one or more APIs exposed by application 1030. Storage interface 1050 operatively couples server device 1000 to data storage 1060. Storage interface 1050 can take the form of a physical hardware interface when data storage 1060 is a storage device integrated with server 1000. However, data storage 1060 can also take the form of be a storage server, network storage, or remote storage having a similar structure as server device 1000. In this example, storage interface 1050 can be a communication interface.

Server device 1000 is one example of a computing device that can implement aspects of the present systems and methods. In general, as utilized herein, a "server" refers to a type of computing device having one or more computer processors coupled to a memory (e.g., a non-transitory, computer-readable storage medium) storing computer-executable instructions for providing a service or remote functionality to one or more electronic communication devices 500, as shown in FIG. 3. The server can be a virtual machine including virtualized hardware elements executing on one or more physical computing devices like server device 1000. According to another example, the server can be a package of computer-executable instructions and computer-readable data, which is executed on a virtual platform. The virtual platform can include an bundle of computing resources provided by one or more physical computing devices and can provide an execution environment for the application 1030. In other words, the server can be provided as a cloud-based service and, further, can be provided on top of additional cloud computing services (e.g., platform-as-a-service, infrastructure-as-a-service, etc.).

Examples of Networked and Distributed Environments

One of ordinary skill in the art can appreciate that the various examples of systems and methods described herein can be implemented in connection with any electronic computing device, client device, or server device, which can be deployed as part of a computer network or in a distributed computing environment such as the cloud. The various examples described herein can be implemented in substantially any computer system or computing environment having any number of memory or storage units, any number of processing units, and any number of applications and processes occurring across any number of storage units and processing units. This includes, but is not limited to, cloud environments with physical computing devices (e.g., servers) aggregating computing resources (i.e., memory, persistent storage, processor cycles, network bandwidth, etc.) which are distributed among a plurality of computable objects. The physical computing devices can intercommunicate via a variety of physical communication links such as wired communication media (e.g., fiber optics, twisted pair wires, coaxial cables, etc.) and/or wireless communication media (e.g., microwave, satellite, cellular, radio or spread spectrum, free-space optical, etc.). The physical computing devices can be aggregated and exposed according to various levels of abstraction for use by application or service providers, to provide computing services or functionality to electronic computing devices. The electronic computing devices can access the computing services or functionality via application program interfaces (APIs), web browsers, or other standalone or networked applications. Accordingly, aspects of the present systems and methods may be implemented based on such a cloud environment. For example, a support system can reside in the cloud environment such that the computer-executable instruction implementing the functionality thereof are executed with the aggregated computing resources provided by the plurality of physical computing devices. The cloud environment provides one or more methods of access to the support system, which are utilized by the present software on a computing device. These methods of access include IP addresses, domain names, URIs, etc. Since the aggregated computing resources can be provided by physical computing device remotely located from one another, the cloud environment can include additional devices such as a routers, load balancers, switches, etc., that appropriately coordinate network data.

Figure 6:
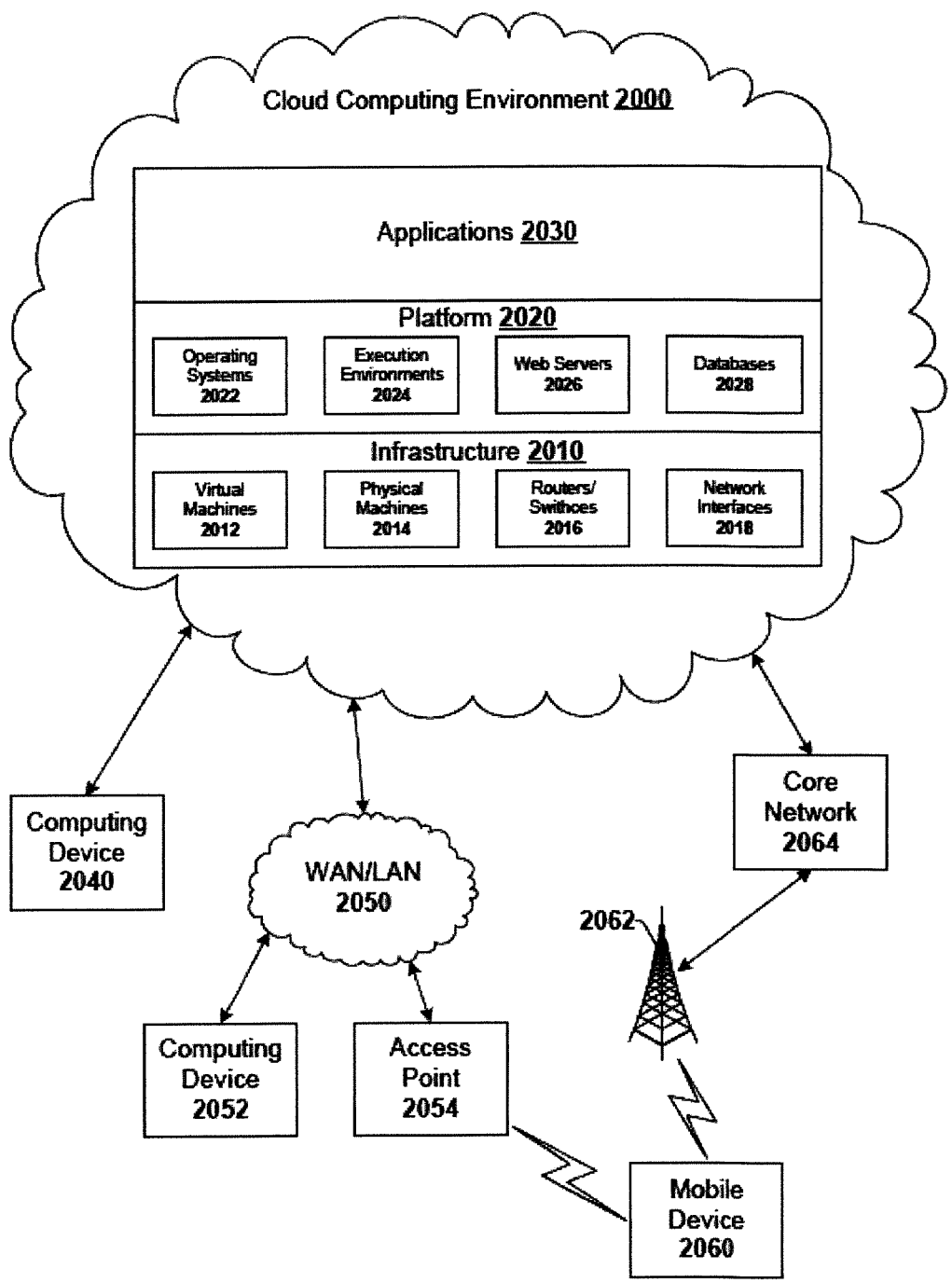
FIG. 6 is a block diagram representing an exemplary, non-limiting networked environment, including cloud or internet based, in which various examples described herein can be implemented.

FIG. 6 provides a schematic diagram of an exemplary networked or distributed computing environment, such as a cloud computing environment 2000. The cloud computing environment 2000 represents a collection of computing resources available, typically via the Internet, to one or more client devices. The cloud computing environment 2000 comprises various levels of abstraction: infrastructure 2010, a platform 2020, and applications 2030. Each level, from infrastructure 2010 to applications 2030 is generally implemented on top of lower levels, with infrastructure 2010 representing the lowest level.

Infrastructure 2010 generally encompasses the physical resources and components on which cloud services are deployed. For instance, infrastructure 2010 may include virtual machines 2012, physical machines 2014, routers/switches 2016, and network interfaces 2018. The network interfaces 2018 provide access to the cloud computing environment 2000, via the Internet or other network, from client devices such as computing devices 2040, 2052, 2060, etc. That is, network interfaces 2018 provide an outermost boundary of cloud computing environment 2000 and couple the cloud computing environment 2000 to other networks, the Internet, and electronic computing devices. Routers/switches 2016 couple the network interfaces 2018 to physical machines 2014, which are computing devices comprising computer processors, memory, mass storage devices, etc. Hardware of physical machines 2014 can be virtualized to provide virtual machines 2012. In an aspect, virtual machines 2012 can be executed on one or more physical machines 2014. That is, one physical machine 2014 can include a plurality of virtual machines 2012.

Implemented on infrastructure 2010, platform 2020 includes software that forming a foundation for applications 2030. The software forming platform 2020 includes operating systems 2022, programming or execution environments 2024, web servers 2026, and databases 2028. The software of platform 2020 may be configured to be installed on virtual machines 2012 and/or physical machines 2014.

Applications 2030 include user-facing software applications, implemented on platform 2020, that provide services to various electronic computing devices. In this regard, support system or application server 920 of the systems and methods described herein are examples of application 2030. As illustrated in FIG. 20, electronic computing devices may include computing devices 2040, 2052 and mobile device 2060. Computing devices 2040, 2052 may be directly coupled to the Internet, and therefore the cloud computing environment 2000, or indirectly coupled to the Internet via a WAN/LAN 2050. The WAN/LAN 2050 may include an access point 2054 that enables wireless communications (e.g., WiFi) with mobile device 2060. In this regard, via access point 2054 and WAN/LAN 2050, mobile device 2060 may be configured to communicate wirelessly with the cloud computing environment 2000. Mobile device 2060 can also wirelessly communicate according to cellular technology such as, but not limited to, GSM, LTE, WiMAX, HSPA, etc. Accordingly, mobile device 2060 can wireless communicate with a base station 2062, which is coupled to a core network 2064 of a wireless communication provider. The core network 2064 includes a gateway to the Internet and, via the Internet, provides a communication path to the cloud computing environment 2000.

Examples of Computing Environment

As mentioned, advantageously, the techniques described herein may be applied to any device where it is desirable to provide the present systems and methods. It can be understood, therefore, that handheld, portable and other computing devices and computing objects of all kinds are contemplated for use in connection with the various examples. Accordingly, the below general purpose computer described below in FIG. 7 is but one example of an electronic computing device.

Examples can partly be implemented via an operating system, for use by a developer of services for a device or object, and/or included within application software that operates to perform one or more functional aspects of the various examples described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
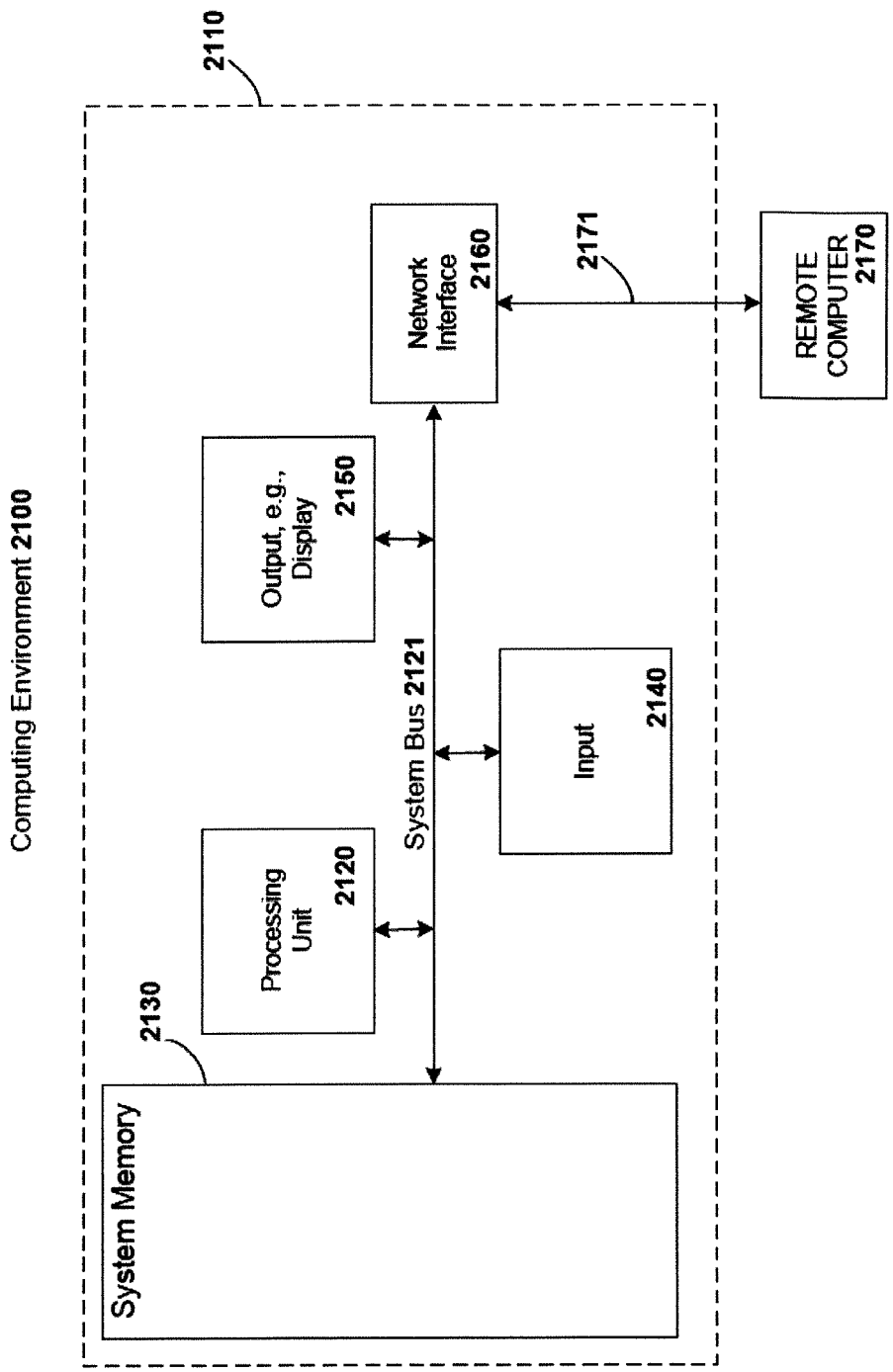
FIG. 7 is a block diagram representing an exemplary, non-limiting computing system or operating environment in which one or more aspects of various examples described herein can be implemented.

FIG. 7 thus illustrates an example of a suitable computing system environment 2100 in which one or aspects of the examples described herein can be implemented, although as made clear above, the computing system environment 2100 is only one example of a suitable computing environment and is not intended to suggest any limitation as to scope of use or functionality. In addition, the computing system environment 2100 is not intended to be interpreted as having any dependency relating to any one or combination of components illustrated in the exemplary computing system environment 2100.

With reference to FIG. 7, an exemplary device for implementing one or more examples includes a general purpose computing device in the form of a computer 2110. Components of computer 2110 may include, but are not limited to, a processing unit 2120, a system memory 2130, and a system bus 2122 that couples various system components including the system memory to the processing unit 2120.

Computer 2110 typically includes a variety of computer readable media and can be any available media that can be accessed by computer 2110. The system memory 2130 may include computer storage media in the form of volatile and/or nonvolatile memory such as read only memory (ROM) and/or random access memory (RAM). By way of example, and not limitation, system memory 2130 may also include an operating system, application programs, other program modules, and program data. According to a further example, computer 2110 can also include a variety of other media (not shown), which may include, without limitation, RAM, ROM, EEPROM, flash memory or other memory technology, compact disk (CD) ROM, digital versatile disk (DVD) or other optical disk storage, or other tangible and/or non-transitory media which can be used to store desired information.

A user is enabled to enter commands and information into the computer 2110 through input devices 2140. A monitor or other type of display device is also connected to the system bus 2122 via an interface, such as output interface 2150. In addition to a monitor, computers can also include other peripheral output devices such as speakers and a printer, which may be connected through output interface 2150.

The computer 2110 may operate in a networked or distributed environment using logical connections to one or more other remote computers, such as remote computer 2170. The remote computer 2170 may be a personal computer, a server, a router, a network PC, a peer device or other common network node, or any other remote media consumption or transmission device, and may include any or all of the elements described above relative to the computer 2110. The logical connections depicted in FIG. 7 include a network 2172, such local area network (LAN) or a wide area network (WAN), but may also include other networks/buses.

Such networking environments are commonplace in homes, offices, enterprise-wide computer networks, intranets and the Internet.

As mentioned above, while exemplary examples have been described in connection with various computing devices and network architectures, the underlying concepts may be applied to any network system and any computing device or system in which it is desirable to implement the present systems and methods.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, examples herein are contemplated from the standpoint of an API (or other software object), as well as from a software or hardware object that implements one or more examples as described herein. Thus, various examples described herein can have aspects that are wholly in hardware, partly in hardware and partly in software, as well as in software.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the term "exemplary" is intended to mean "serving as an illustration or example of something."

Illustrative examples have been described, hereinabove. It will be apparent to those skilled in the art that the above devices and methods may incorporate changes and modifications without departing from the general scope of the claimed subject matter. It is intended to include all such modifications and alterations within the scope of the claimed subject matter. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for operating a mobile storefront comprising:
   one or more mobile stores, each including an inventory compartment and a mobile store electronic communication device;
   a customer electronic communication device; and
   a processor coupled to a computer readable storage medium having stored thereon computer executable instructions for use in controlling inventory in the inventory compartments of the one or more mobile stores, the computer readable instructions, when executed by the processor, configuring the processor to:
   synchronize a supplying mobile store to the customer electronic communication device from the one or more mobile stores in a region based on available customer data, available via the customer electronic communication device and the inventory, available to the supplying mobile store via the one or more mobile stores' electronic communication devices or through a franchise distribution model;
   communicate a selection of one or more selected inventory items to the mobile store electronic communication device of the supplying mobile store for approval, via the mobile store electronic communication device of the supplying mobile store, and a sale to a customer, via the mobile store electronic communication device of the supplying mobile store; and
   automatically update the inventory available via the one or more mobile stores' electronic communication devices or through the franchise distribution model upon the sale to the customer.

2. The system of claim 1, wherein the available customer data includes customer status, customer location, and customer financing arrangement.

3. The system of claim 1, wherein the step to automatically update the inventory further comprises changing an availability identifier of the selected inventory item upon receipt of an authorization signal, wherein the authorization signal is a result of the supplying mobile store approval, via the mobile store electronic communication device.

4. The system of claim 1, wherein the inventory available via the one or more stores' electronic communication device includes inventory available as: one or more stocked inventory items within the inventory compartment; one or more stocked inventory items within a partner inventory compartment; and one or more inventory items in a warehouse.

5. The system of claim 1, wherein the processor is further configured to communicate stocking parameters to a franchise distributor for stocking or restocking the one or more selected inventory items in the inventory compartment of the one or more mobile stores.

6. The system of claim 5, wherein upon communicating the stocking parameters to the franchise distributor, the processor automatically communicates, via the electronic communication devices of the one or more mobile stores, availability of the one or more inventory items.

7. The system of claim 3, wherein the authorization signal is a result of a payment confirmation.

8. The system of claim 1, wherein upon selection of the one or more inventory items the customer is provided, via the customer electronic communication device, with payment options including one or more of a direct payment, a timed payment, a payment from a corporate account, a financed payment, a third-party payment service to establish the customer financing arrangement approved via the supplying mobile store electronic communication device.

9. The system of claim 8, wherein the one or more payment options provided to the customer, via the customer electronic communication device, is determined by the supplying mobile store, via the mobile store electronic communication device of the supplying mobile store.

10. The system of claim 1, wherein the processor identifies mobile store support and repair service capabilities of the supplying mobile store to the customer from the mobile store electronic communication device of the supplying mobile store to the customer electronic communication device.

11. A non-transitory computer readable medium with computer executable instructions stored thereon executed by a processor to perform the method of operating a mobile storefront, the computer-executable instructions comprising:
   a software application, when executed by the processor, configures the processor to:
   synchronize a supplying mobile storefront from one or more mobile storefronts in a region based on available customer data, available via the customer electronic communication device, in combination with a franchise distribution model;

communicate, through the display of the customer electronic communication device, an availability of at least one inventory item available through the supplying mobile storefront for selection via the customer electronic communication device and payment options for the at least one inventory item wherein the payment options made available are chosen by the supplying mobile storefront via the mobile store electronic communication device;

communicate a selection of the one or more inventory items and a selected payment option from the payment options to the mobile store electronic communication device of the supplying mobile storefront for approval of a sale of the one or more inventory items and the selected payment option by the supplying mobile storefront where approval is made by the supplying mobile storefront via a mobile store electronic communication device of the supplying mobile storefront.

12. The computer readable medium of claim 11, wherein the payment options include at least one of a direct payment, a timed payment, a payment from a corporate account, a financed payment, and a payment from a third-party payment service.

13. The computer readable medium of claim 11, wherein the processor further communicates delivery options made available by the supplying mobile storefront via the mobile store electronic communication device of the supplying mobile storefront for selection through the customer electronic communication device by a customer and, upon approval, delivery of the selection of the one or more inventory items is implemented by the mobile store electronic communication device of the supplying mobile storefront.

14. The computer readable medium of claim 11, wherein the computer readable instructions further configure the processor to automatically change the inventory availability of items in the supplying mobile storefront upon approval of the selected payment option from the customer by the supplying mobile storefront.

15. The computer readable medium of claim 11, wherein the computer readable instructions further configure the processor to generate a timed payment calculator to determine and communicate terms of a timed payment for the selected items, a service, or a support offered from the supplying mobile storefront.

16. The computer readable medium of claim 11, wherein the computer readable instructions further configure the processor to communicate with the one or more mobile storefronts or a distributor in a predetermined geographical region to pool inventory of items available through the supplying mobile storefront from the one or more mobile storefronts or a distributor in the predetermined geographical region.

17. The computer readable medium of claim 11, wherein the processor generates a timed payment based on the available customer data or provides a financing account balance to the customer via the customer electronic communication device.

18. The computer readable medium of claim 11, wherein the processor enables registration by a new customer and identifies a location of the new customer and automatically notifies the supplying mobile storefront near the identified new customer location for approval of access to items, services, or support from the supplying mobile storefront.

19. A system for operating a mobile storefront comprising:
one or more mobile stores, each including an inventory compartment and a mobile store electronic communication device;
a customer electronic communication device; and
a processor coupled to a computer readable storage medium having stored thereon computer executable instructions for use in controlling inventory in the inventory compartments of the one or more mobile stores, the computer readable instructions, when executed by the processor, configuring the processor to:
synchronize a supplying mobile store to the customer electronic communication device from the one or more mobile stores in a region based on available customer data, available via the customer electronic communication device, and the inventory available via the one or more mobile stores' electronic communication devices or through a franchise distribution model, where upon synchronizing the supplying mobile store to the customer electronic communication device the supplying mobile store maintains control of the inventory, via the mobile store electronic communication device of the supplying mobile store, that is communicated as being available to the customer via the customer electronic communication device.

20. The system of claim 19, where upon synchronizing the supplying mobile store to the customer electronic communication device, the supplying mobile store maintains control of one or more of payment options, distributor pricing, or delivery options, via the mobile store electronic communication device of the supplying mobile store, that is communicated as being available to the customer via the customer electronic communication device.

* * * * *